US009664102B2

(12) United States Patent
Sheidler et al.

(10) Patent No.: US 9,664,102 B2
(45) Date of Patent: May 30, 2017

(54) POWER SYSTEM WITH AN INTAKE GAS COOLER

(71) Applicant: DEERE & COMPANY, Moline, IL (US)

(72) Inventors: Alan D. Sheidler, Moline, IL (US); Matthew R. Evers, Cedar Falls, IA (US); Craig W. Lohmann, Denver, IA (US)

(73) Assignee: DEERE & COMPANY, Moline, IL (US)

( * ) Notice: Subject to any disclaimer, the term of this patent is extended or adjusted under 35 U.S.C. 154(b) by 111 days.

(21) Appl. No.: 14/533,815

(22) Filed: Nov. 5, 2014

(65) Prior Publication Data

US 2016/0123213 A1  May 5, 2016

(51) Int. Cl.

| | | |
|---|---|---|
| *F01P 3/00* | (2006.01) | |
| *F01P 3/02* | (2006.01) | |
| *F01P 3/12* | (2006.01) | |
| *F01P 1/02* | (2006.01) | |
| *F02B 29/04* | (2006.01) | |
| *F02M 26/09* | (2016.01) | |
| *F02M 26/02* | (2016.01) | |
| *F02M 26/22* | (2016.01) | |
| *F02M 26/28* | (2016.01) | |
| *F02M 26/29* | (2016.01) | |
| *F02M 26/32* | (2016.01) | |
| *F01P 3/20* | (2006.01) | |
| *F02M 25/07* | (2006.01) | |
| *F01P 1/06* | (2006.01) | |
| *F02M 26/05* | (2016.01) | |
| *F02M 26/06* | (2016.01) | |

(52) U.S. Cl.
CPC ........ *F01P 3/20* (2013.01); *F01P 1/06* (2013.01); *F02B 29/0412* (2013.01); *F02B 29/0462* (2013.01); *F02B 29/0475* (2013.01); *F02M 25/073* (2013.01); *F02M 25/077* (2013.01); *F02M 25/0711* (2013.01); *F02M 25/0739* (2013.01); *F01P 2060/02* (2013.01); *Y02T 10/146* (2013.01)

(58) Field of Classification Search
CPC ........ F02M 26/21; F02M 26/30; F02M 26/32; F02M 35/10268; F02M 35/10288
USPC ............. 60/605.2, 612; 123/563, 56.11, 562; 165/140, 141
See application file for complete search history.

(56) References Cited

U.S. PATENT DOCUMENTS

| | | |
|---|---|---|
| 3,752,132 A | 8/1973 | Bentz et al. |
| 5,180,003 A | 1/1993 | Kouzel et al. |
| 7,011,080 B2 * | 3/2006 | Kennedy ............. F02B 29/0418 123/568.12 |

(Continued)

FOREIGN PATENT DOCUMENTS

| | | | |
|---|---|---|---|
| CN | 201747445 U | 2/2011 | |
| DE | 102004050778 A1 * | 4/2006 | .......... F02B 29/0418 |

(Continued)

*Primary Examiner* — Phutthiwat Wongwian
*Assistant Examiner* — Jessica Kebea (57) ABSTRACT

A power system including an intake gas cooler and aftercooler positioned gaseously downstream thereof. The intake gas cooler is configured to receive a fresh intake gas for combusting in an engine and a recirculated exhaust gas expelled by the engine for re-combusting therein.

9 Claims, 4 Drawing Sheets

(56) References Cited

U.S. PATENT DOCUMENTS

| | | | | |
|---|---|---|---|---|
| 7,243,495 B2* | 7/2007 | Whelan | F02B 29/0406 |
| | | | 123/568.12 |
| 7,313,918 B2* | 1/2008 | Melchior | F01L 1/34 |
| | | | 123/188.14 |
| 7,451,749 B2* | 11/2008 | Kardos | F02B 29/0418 |
| | | | 123/568.12 |
| 7,610,954 B2 | 11/2009 | Ando et al. | |
| 7,717,069 B2 | 5/2010 | Mokire et al. | |
| 7,806,091 B2* | 10/2010 | Esau | F02B 29/0412 |
| | | | 123/41.29 |
| 8,037,685 B2* | 10/2011 | Kolb | F28D 1/0435 |
| | | | 123/563 |
| 8,146,542 B2* | 4/2012 | Cattani | F01P 3/12 |
| | | | 123/41.1 |
| 8,371,278 B2* | 2/2013 | Winsor | F02B 29/0412 |
| | | | 123/25 C |
| 8,375,926 B2* | 2/2013 | Sheidler | F02B 29/0418 |
| | | | 123/542 |
| 8,590,599 B2* | 11/2013 | Kardos | F02B 29/0456 |
| | | | 123/41.45 |
| 8,695,340 B2* | 4/2014 | Kardos | F02B 29/0412 |
| | | | 123/568.12 |
| 9,435,250 B2* | 9/2016 | Choi | F02B 29/0437 |
| 2006/0278377 A1* | 12/2006 | Martins | F02B 29/0412 |
| | | | 165/140 |
| 2007/0271910 A1* | 11/2007 | Chanfreau | F02B 29/0418 |
| | | | 60/320 |
| 2008/0000228 A1* | 1/2008 | Kieser | F02B 29/0412 |
| | | | 60/605.1 |
| 2008/0190109 A1* | 8/2008 | Kardos | F02B 29/0412 |
| | | | 60/605.2 |
| 2010/0037608 A1* | 2/2010 | Dierbeck | F02B 29/0437 |
| | | | 60/605.2 |
| 2010/0095939 A1* | 4/2010 | Geskes | F02B 29/0475 |
| | | | 123/556 |
| 2010/0263369 A1* | 10/2010 | Kardos | F02B 29/0412 |
| | | | 60/599 |
| 2012/0055156 A1* | 3/2012 | Grimm | F02M 26/16 |
| | | | 60/605.2 |
| 2013/0139491 A1 | 6/2013 | Garnepudi | |
| 2013/0283784 A1* | 10/2013 | Uzkan | F01K 13/00 |
| | | | 60/604 |

FOREIGN PATENT DOCUMENTS

| | | | | |
|---|---|---|---|---|
| GB | 2438274 A * | 11/2007 | | F28D 19/042 |
| WO | WO 2004044402 A1 * | 5/2004 | | F02B 29/0443 |

* cited by examiner

FIG. 5

POWER SYSTEM WITH AN INTAKE GAS COOLER

FIELD OF THE DISCLOSURE

The present disclosure relates to a power system having an intake gas cooler.

BACKGROUND OF THE DISCLOSURE

A power system may include an engine and a heat transfer system for heating some components and cooling other components. Running the engine at too high of a temperature may cause preignition, knock, burned pistons and valves, and lubrication failure. Conversely, running the engine at too low of a temperature may cause unnecessary wear, poor fuel economy, and the accumulation of water and sludge in the crankcase. Regulating temperatures with the heat transfer system keeps the engine at its best temperature levels for operation.

Engines and heat transfer systems currently in development for emissions regulated markets are being designed to provide cooling and heating for many different engine subsystems. Engine power levels are increasing and emissions regulations are tightening, and as a result, cooling and heating needs to support such engines are resulting in larger and larger pumps, heat exchangers, and fans. Despite such increases in size, certain components in the engine may be operating at temperatures that are too high and others, too low. In some cases, these increases in size result in a lot of the engine's power being used for cooling and heating purposes, rather than for propelling a vehicle, for example.

SUMMARY OF THE DISCLOSURE

A power system including an intake gas cooler and aftercooler positioned gaseously downstream thereof. The intake gas cooler is configured to receive a fresh intake gas for combusting in an engine and a recirculated exhaust gas expelled by the engine for re-combusting therein.

BRIEF DESCRIPTION OF THE DRAWING

The detailed description of the drawings refers to the accompanying figures in which.

DETAILED DESCRIPTION OF THE DRAWINGS

Figure 1:
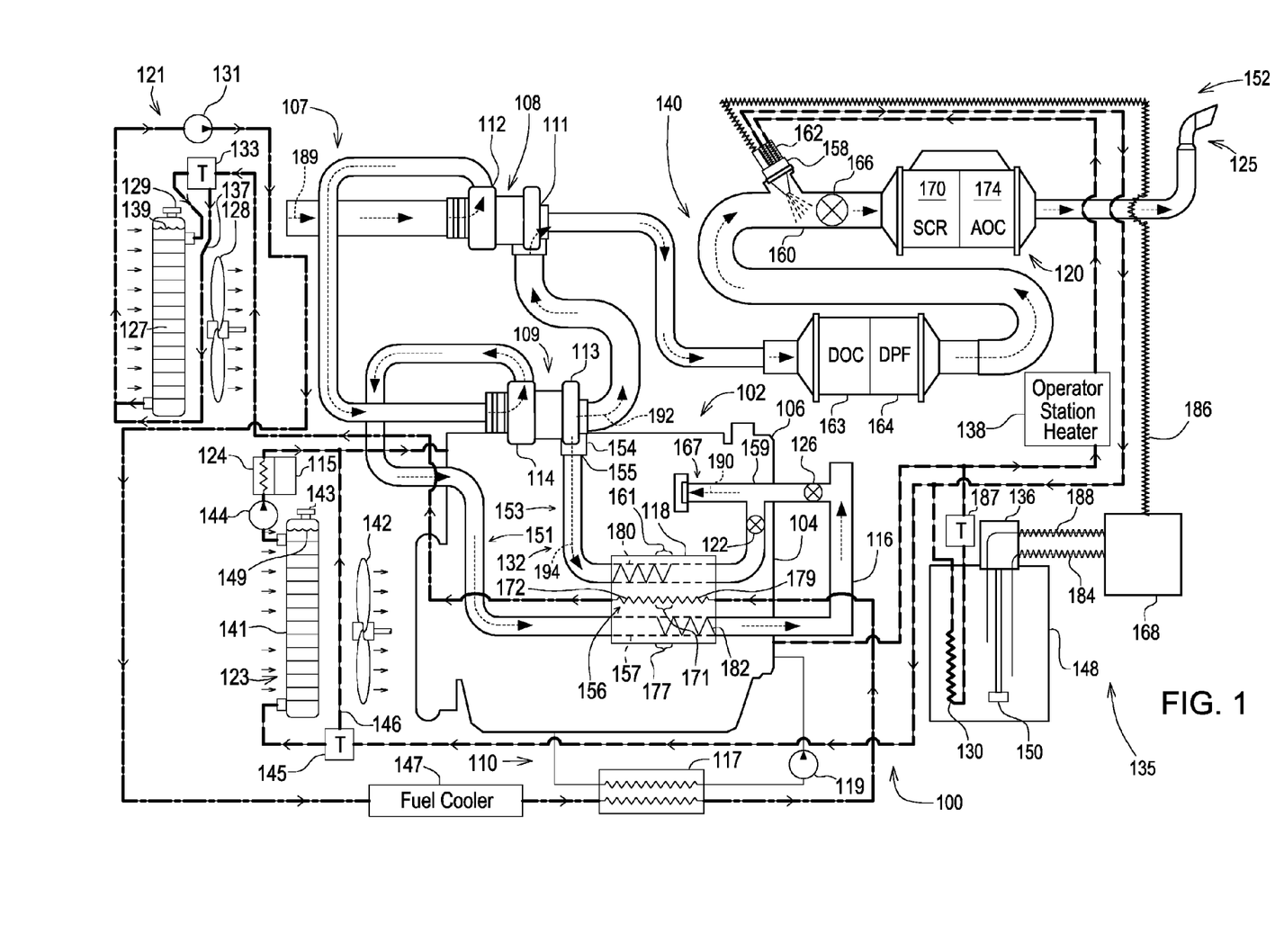
FIG. 1 is a schematic illustration of a first embodiment of a power system having an intake gas cooler that defines a portion of a fresh intake gas passageway, the portion of the fresh intake gas passageway being gaseously downstream of an HP compressor.

In FIG. 1, there is shown a schematic illustration of a power system 100 for providing power to a variety of machines. For example, the machine may be an on-highway truck, a construction vehicle, a marine vessel, a stationary generator, an automobile, an agricultural vehicle, or a recreational vehicle. The power system 100 includes an engine 102 that may be any kind that produces an exhaust gas, the exhaust gas being represented by directional arrow 192. The engine 102 may be a gasoline engine, a diesel engine, or any other gaseous fuel burning engine. The engine 102 is lubricated with a lube oil, and includes a block 104 and a head 106 mounted thereto.

The power system 100 may include an intake system 107 for introducing a fresh intake gas into the engine 102, as indicated by directional arrow 189. Among other things, the intake system 107 may include an intake manifold in communication with the cylinders and an air throttle actuator 126. The air throttle actuator 126 may be positioned downstream of an aftercooler 116, and it may be a flap type valve controlled by the engine control unit (ECU) 115 for regulating the air-fuel ratio.

Further, the power system 100 includes an exhaust system 140 for directing exhaust gas from the engine 102 and into the atmosphere. The exhaust system 140 may include an exhaust manifold 154 in fluid communication with the cylinders. A low pressure (LP) turbocharger may be gaseously coupled to the engine 102, and it has an LP turbine 111 and an LP compressor 112 coupled thereto. A high pressure (HP) turbocharger gaseously coupled to the engine 102. The HP turbocharger 109 has an HP turbine 113 and an HP compressor 114 coupled thereto. The HP turbine 113 is positioned gaseously upstream of the LP turbine 111, and the HP compressor 114 is positioned gaseously downstream of the LP compressor 112. An inlet 155 of the EGR passage 153 is positioned gaseously upstream of the LP turbine 111 and the HP turbine 113 relative to the direction of the exhaust gas flow flowing through the tailpipe 125.

The power system 100 may also have an EGR system 132 for receiving a recirculated portion of the exhaust gas, as the recirculated portion being shown by directional arrow 194. The combined intake gas is indicated by directional arrow 190, and it is a combination of the fresh intake gas and the recirculated portion of the exhaust gas. The EGR system 132 has an EGR valve 122 and an EGR mixer. The aftercooler 116 may be positioned gaseously downstream of the HP compressor 114 and gaseously upstream of a mixing junction 159.

The power system 100 may include a fresh intake gas passage 151 configured to receive a fresh intake gas and an exhaust gas recirculation (EGR) passage 153. The intake gas cooler 118 defines a portion 161 of the EGR passage 153 and a portion 157 of the fresh intake gas passage 151. The portion 157 of the fresh intake gas passage 151 is positioned gaseously downstream of the HP compressor 114. In this embodiment, the portion 157 of the fresh intake gas passage 151 is separate and distinct from the portion 161 of the EGR passage 153, such that the fresh intake gas and the recirculated exhaust gas do not mix in the intake gas cooler 118. A combined intake gas passage 167 may be positioned gaseously downstream of the fresh intake gas passage 151 and the EGR passage 153. The combined intake gas passage 167 receives a combined intake gas comprising the fresh intake gas and the recirculated exhaust gas.

An aftercooler 116 is positioned gaseously downstream of the intake gas cooler 118. The aftercooler 116 may be an air-to-air cooler and may be made of aluminum, as a result of the cooling and pressure decreases that occur upstream thereof in the intake gas cooler 118. Having the combination of the intake gas cooler 118 and the aftercooler 116 may result in very cool temperatures and low pressures at the intake manifold, making it possible for the engine 102 to produce high power levels.

As illustrated, the circuit fluid passage 156 may include a heat exchange section 172, the EGR passage 153 may include an EGR heat exchange section 180, and the fresh intake gas passage 151 may include an intake heat exchange section 182. In this embodiment, a segment 171 of the heat exchange section 172 overlaps a segment 161 of the EGR heat exchange section 180, and also the segment 171 of the heat exchange section 172 overlaps a segment 177 of the intake heat exchange section 182.

The EGR heat exchange section 180 may extend substantially along a downstream section of the heat exchange section 172, while the intake heat exchange section 182 may extend substantially along an upstream section. The EGR heat exchange section 180 is typically hotter than the intake heat exchange section 182 and may be cooled after the intake heat exchange section 182, so as to preserve a large temperature difference between these sections and the heat exchange section 172.

In some embodiments, the EGR heat exchange section 180 may be positioned parallel to the intake heat exchange section 182. As illustrated, they may overlap one another (e.g., the inlet of the EGR heat exchange section 180 and the outlet of the intake heat exchange section 182) on opposite sides of the heat exchange section 172. Such an overlap may allow the heat exchange section 172 to moderate the temperature of both the EGR heat exchange section 180 and the intake heat exchange section 182 in this region.

In the illustrated embodiment, the power system 100 includes a first heat transfer circuit 121 and a second heat transfer circuit 123, both of which are coupled to the engine 102. Other embodiments of the power system 100 having the intake gas cooler 118 may have a single heat transfer circuit, instead of two separate heat transfer circuits. The first circuit 121 includes a first heat exchanger 141 and a lube oil cooler 117 fluidly coupled thereto. A portion 179 of the first circuit 121 is defined by the intake gas cooler 118. The second circuit 123 includes a second heat exchanger 141 for cooling a second circuit fluid 149 that circulates through the block 104 and the head 106. The block 104 and head 106 may include passages for second circuit fluid 149 to circulate around the cylinders and valves of the engine 102.

The second circuit 123 is separate from the first circuit 121, such that the second circuit fluid 149 does not mix with the first circuit fluid 139. This allows the first and second circuit fluids 139, 149 to be at their own temperatures and to produce their own vapor pressures within their respective circuits. The first and second circuit fluids 139, 149 may enter one end of their respective first and second heat exchangers 127, 141 and circulate through a series of small tubes surrounded by fins and air passages. The first and second circuit fluids 139, 149 then reach the opposite ends and are recirculated. Each of the first and second heat exchangers 127, 141 may be, for example, tubular or tube-and-fin type core radiators.

The first heat exchanger 127 may be cooled with a first fan 128, and the second heat exchanger 131, with a second fan 142. Each of the first and second fans 128, 142 may be driven by the crankshaft of the engine 102 or an electric motor, for example. The first and second fans 128, 142 may be, for example, suction-type or blower-type fans. In other embodiments, the first and second heat exchangers 127, 141 may be cooled with a single fan. The components of the first and second circuits 121, 123 may be coupled to one another by connecting hoses that provide flexible connections therebetween.

This combination of the first and second heat exchangers 127, 141 and the first and second fans 128, 142 results in smaller, more affordable components. Further, the combination results in the ability to control the first and second circuits 121, 123, so as to conserve power and fuel usage related thereto. Additionally, the combination of the first and second heat exchangers 127, 141 may result in more favorable temperature distributions therein. During low loads on the power system 100 or at low ambient temperatures, one of the first and second fans 128, 142 may be off or at a reduced speed. As just one specific example, when there is a high operating load on the engine 102 and when there is a low ambient temperature, the second fan 142 used for cooling the second heat exchanger 141 may be in operation. But in contrast, the first fan 128 used for cooling the first heat exchanger 127 may be off or reduced in speed, as a result of the lube oil and the intake gas flow already being relatively cold. By turning off or reducing the speed of the first fan 128, the overall power use by the first and second circuits 121, 123 is lower. This results in improved power and fuel efficiency characteristics of the power system 100.

An engine control unit 115 may be used for controlling the first and second fans 128, 142. Moreover, the ECU 115 may have the following additional functions: converting analog sensor inputs to digital outputs, performing mathematical computations, performing diagnostics, and storing information. As shown, the second circuit 123 may include an ECU cooler 124 for cooling the ECU 115.

A first pump 131 may be used for circulating the first circuit fluid 139, and a second pump 144 may be used for circulating and pumping the second circuit fluid 149. The first and second pumps 131, 144 may be fixed or variable speed pumps and may be electrically or mechanically driven, depending on the application. By having the first and second pumps 131, 144, one may be on and one may be off, so as to preserve the power and fuel of the engine 102. In some embodiments of the power system 100, the first and second circuits 121, 123 may share a single pump, having a pair of pumping vanes, for example.

As further shown, the exhaust system 140 includes an aftertreatment system 120, and at least some of the exhaust gas passes therethrough. The aftertreatment system 120 removes various chemical compounds and particulate emissions present in the exhaust gas received from the engine 102. After being treated by the aftertreatment system 120, the exhaust gas is expelled into the atmosphere via a tailpipe 125.

The aftertreatment system 120 is shown having a diesel oxidation catalyst (DOC) 163, a diesel particulate filter (DPF) 164, and a selective catalytic reduction (SCR) system 152, though the need for such components depends on the particular size and application of the power system 100. The SCR system 152 has a reductant delivery system 135, an SCR catalyst 170, and an ammonia oxidation catalyst AOC 174. The exhaust gas may flow through the DOC 163, the DPF 164, the SCR catalyst 170, and the AOC 174. Exhaust gas that is treated in the aftertreatment system 120 contains significantly fewer pollutants (e.g., particulate matter, $NO_x$, and hydrocarbons) than an untreated exhaust gas.

Moreover, the reductant delivery system 135 may include a reductant tank 148 for storing the reductant. The reductant delivery system 135 may include a reductant header 136 mounted to the reductant tank 148, the reductant header 136 further including, in some embodiments, a level sensor 150 for measuring a quantity of the reductant in the reductant tank 148. The level sensor 150 may include a float for floating at a liquid/air surface interface of reductant included within the reductant tank 148.

The second circuit fluid 149 circulates through the reductant heater 130, so as to warm the reductant in the reductant tank 148, thereby reducing the risk that the reductant freezes therein and/or thawing the reductant upon startup. In an alternative embodiment of the power system 100, the reductant heater 130 may, instead, be included as part of the first circuit 121 or it may be an electrically resistive heating element. When the second circuit fluid 149 exits the second heat exchanger 141, the second circuit fluid 149 circulates through the block 104 and the head 106 and then periodically circulates through reductant heater 130. The reductant heater 130 periodically warms the reductant, for example when the power system 100 is turned on and the ambient temperature is below the freezing point of the reductant.

The reductant heater 130 receives a steady flow of the second circuit fluid 149 when, for example, the reductant tank thermostat 187 is in an open position. Alternatively, the reductant heater 130 does not receive a steady flow of the second circuit fluid 149 when, for example, the reductant tank thermostat 187 is in a closed position. The reductant tank thermostat 187 may be in the closed position, so as to protect the reductant from chemically breaking down as a result of too high of temperatures. In the illustrated power system 100, the second circuit 123 includes an operator station heater 138, fluidly coupled to the second heat exchanger 141, for warming the inside of an operator station.

At least one of the first and second heat transfer circuits 121, 123 may be an opened system or a closed system, depending on the application. The first and second circuit fluids 139, 149 may be, for example, water, fresh water, sea water, an antifreeze mixture, a glycol mixture and the like. In some embodiments of the power system 100, the first and second circuit fluids 139, 149 may be the same kind of fluid, while in other embodiments, they may be unique relative to one another. The first and second circuits 121, 123 may share a single surge tank or have separate surge tanks. The single surge tank embodiment may have a relatively large tank with independent chambers, each of which could draw from an overflow bottle. The overflow bottles would serve as small reservoirs for supplying the respective first and second circuit fluids 139, 149, and they would provide a common fill point for service needs.

The decomposition tube 160 may be positioned downstream of the reductant injector 158 but upstream of the SCR catalyst 170. The reductant injector 158 may be, for example, an injector that is selectively controllable to inject reductant directly into the exhaust gas. As shown, the SCR system 152 may include a reductant mixer 166 that is positioned upstream of the SCR catalyst 170 and downstream of the reductant injector 158. The second circuit 123 may include a reductant injector heater 162, fluidly coupled to the second heat exchanger 141, for warming the reductant injector 158.

The reductant delivery system 135 may also include a reductant pressure source and a reductant extraction passage 184. The extraction passage 184 may be coupled fluidly to the reductant tank 148 and the reductant pressure source therebetween. Although the extraction passage 184 is shown extending into the reductant tank 148, in other embodiments, the extraction passage 184 may be coupled to an extraction tube via the reductant header 136. The reductant delivery system 135 may further include a reductant supply module 168.

The reductant delivery system 135 may also include a reductant dosing passage 186 and a reductant return passage 188. The return passage 188 is shown extending into the reductant tank 148, though in other embodiments, the return passage 188 may be coupled to a return tube via the reductant header 136.

One example of a reductant is a solution having 32.5% high purity urea and 67.5% deionized water (e.g., DEF), which decomposes as it travels through the decomposition tube 160 to produce ammonia. The ammonia reacts with $NO_x$ in the presence of the SCR catalyst 170, and it reduces the $NO_x$ to less harmful emissions, such as $N_2$ and $H_2O$.

When the engine 102 is operating, vapor pressures build up in the first and second circuits 121, 123. As a result, the first circuit 121 may include a first pressure relief valve 129 for opening at a first pressure, and the second circuit 123 may include a second pressure relief valve 129 for opening at a second pressure. The first and second pressure relief valves 129, 143 are shown as being part of their respective first and second heat exchangers 127, 141, but could be placed anywhere in their respective systems. Ultimately, the purpose of each is to provide relief if the pressure in either the first or second circuit 121, 123 becomes too high. The first and second pressure relief valves 129,143 may be mechanically controlled (e.g., heat activated) or could be electronically controlled (e.g., ECU 115 activated).

The first pressure that opens the first pressure relief valve 129 may be higher than the second pressure that opens the second pressure relief valve 143, as a result of the first circuit 121 and its components being able to withstand higher pressures and temperatures. Raising the pressure in the first circuit 121 prevents cavitation and boiling therein, which might otherwise damage its components. The first heat exchanger 127 may be designed for withstanding higher operating pressures (e.g., 18-21 psi or higher), while in contrast, the second heat exchanger 141 may be designed for lower pressures (e.g., 10-15 psi).

The first circuit 121 may include a first thermostat 133 and a first bypass passage 137. The first thermostat 133 provides control of the first circuit 121. For example, when the first thermostat 133 is in a standard position, the first circuit fluid 139 circulates through the first heat exchanger 127. This cools the first circuit fluid 139, and the first circuit fluid 139 cools the other components in the first circuit 121. Alternatively, when the first thermostat 133 is in a bypass position, the first circuit fluid 139 bypasses the first heat exchanger 127, letting the first circuit fluid 139 and the other components in the first circuit 121 to warm up quickly.

The second circuit 123 may include a second thermostat 145 and second bypass passage 146. The second thermostat 145 provides control of the second circuit 123. For example, when the second thermostat 145 is in a standard position, the second circuit fluid 149 circulates through the second heat exchanger 141 for cooling the second circuit fluid 149 and, thus, the other components of the second circuit 123. Alternatively, when the second thermostat 145 is in a bypass position, the second circuit fluid 149 bypasses the second heat exchanger 141. This allows the second circuit fluid 149 and the components in the second circuit 123 to warm up.

Adjustments in the first and second thermostats 133, 145 may be controlled mechanically or by the ECU 115. In some embodiments, the second thermostat 145 may adjust to the standard position thereof at a lower temperature than the first thermostat 133 adjusts to the standard position thereof, meaning that the first circuit 121 operates at a higher temperature than the second circuit 123. For example, the second circuit 123 may operate at a lower temperature for adequately cooling the cylinders of the engine 102, which in many operating modes, requires a steady flow of the second circuit fluid 149 through the second heat exchanger 141. In contrast, the first circuit 121 may operate at a higher temperature for adequately warming the reductant heater 130 and the operation station heater 138, both of which require significant amounts of heat during certain operating conditions (e.g., upon startup of the power system 100 in a cold environment).

In the illustrated power system 100, the first pump 131 circulates the first circuit fluid 139 through the fuel cooler 147, through the lube oil cooler 117, and then through the intake gas cooler 118. The power system 100 includes a lube oil system 110. In the lube oil system 110, a lube oil pump 119 circulates lube oil through the engine 102 and the lube oil cooler 117, the lube oil cooler 117 being configured to cool the lube oil. Depending on the position of the first thermostat 133, the first circuit fluid 139 may circulate through either the first bypass passage 137 or through the first heat exchanger 127. In the first circuit 121, the temperature of the first circuit fluid 139 may gradually rise as it circulates through the first circuit 121. Placing the lube oil cooler 117 before the intake gas cooler 118 ensures that the lube oil cooler 117 is at a low enough temperature to cool the lube oil. Typically, the intake gas cooler 118 is at a high temperature, so even though the first circuit fluid 139 has already been warmed by the lube oil cooler 117, the first circuit fluid 139 is still cool enough to lower the temperature of the intake gas cooler 118 and the recirculated exhaust gas and fresh intake gas flowing therethrough.

In the illustrated power system 100, the second pump 144 circulates the second circuit fluid 149 through the ECU cooler 124, and the block 104, and the head 106. The second circuit fluid 149 may enter the block 104 first or enter the head 106 first. Placing the ECU cooler 124, block 104, and head 106 in these positions may ensure that the second circuit fluid 149 is cool when it circulates therethrough, as a result of being cooled by the second heat exchanger 141. Next, the second circuit fluid 149 circulates out of the block 104 and the head 106 and into the reductant heater 130, assuming that the reductant tank thermostat 187 allows the second circuit fluid 149 to circulate thereto. Placing the reductant heater 130 in this position ensures that the second circuit fluid 149 is quickly warmed for heating the reductant, as a result of being quickly heated by the block 104 and the head 106.

As illustrated, the second circuit fluid 149 may then circulate through the operation station heater 138 and then through the reductant injector heater 162. Placing the operation station heater 138 in this position, in the second circuit 123, ensures that the operation station heater 138 is able to provide quick and adequate heat to the operator of the power system 100, as a result of the second circuit fluid 149 being quickly warmed by the block 104 and the head 106. Finally, depending on the needs of the power system 100 and the position of the second thermostat 145, the second circuit fluid 149 circulates through either the second bypass passage 146 or through the second heat exchanger 141. The circulation of the second circuit fluid 149, through one revolution through the second circuit 123, may be referred to a second heat transfer cycle.

Figure 2:
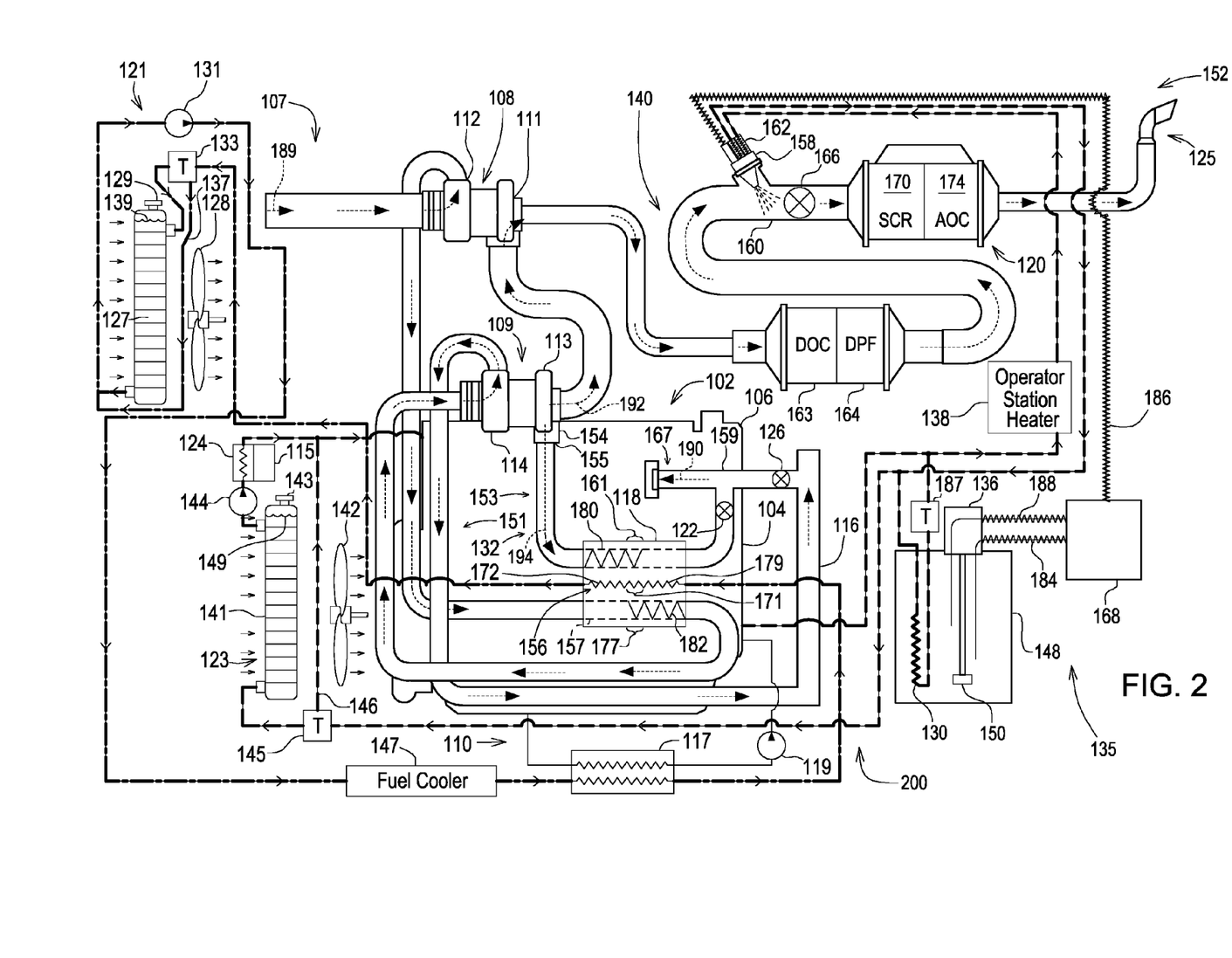
FIG. 2 is a schematic illustration of a second embodiment of a power system having an intake gas cooler that defines a portion of a fresh intake gas passageway, the portion of the fresh intake gas passageway is gaseously upstream of the HP compressor.

Referring to FIG. 2, there is shown a second embodiment of a power system 200. The intake gas cooler 118 defines a portion 161 of the EGR passage 153 and a portion 157 of the fresh intake gas passage 151. The portion 157 of the fresh intake gas passage 151 is positioned gaseously upstream of the HP compressor 114. In this embodiment, the fresh intake gas is cooled in the intake gas cooler 118 prior to entering the HP compressor 114. Such an embodiment cools the fresh intake gas, so as to lower the risk of too high of temperatures at the HP compressor 114 and to lower the risk of damage thereto.

Figure 3:
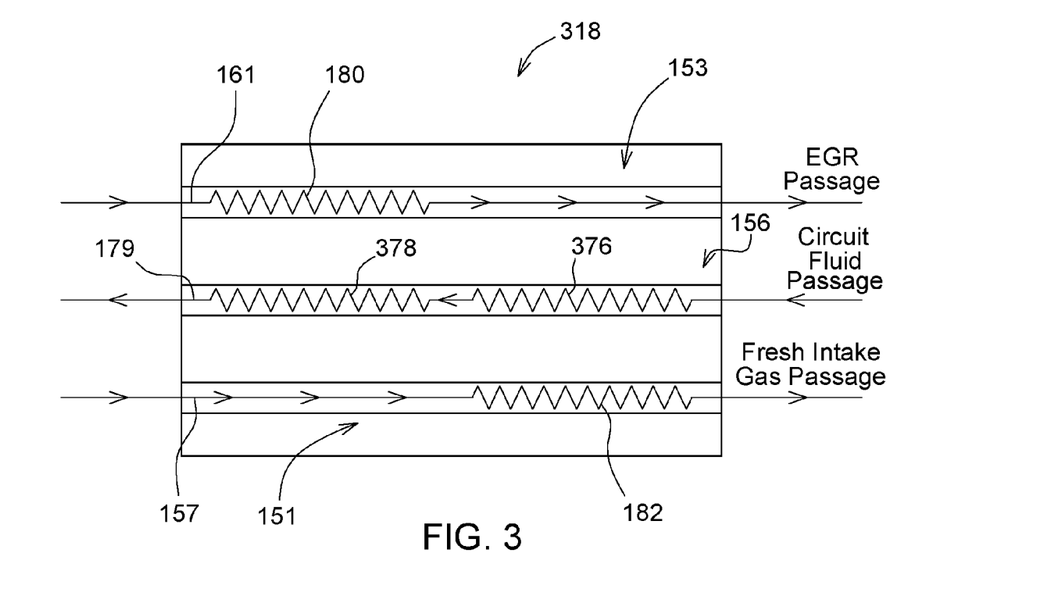
FIG. 3 is a schematic illustration of an intake gas cooler, having first and second heat exchange sections in series with one another.

Next, referring to FIG. 3, there is shown a second embodiment of an intake gas cooler 318, which could be used in, for example, the first or second power systems 100, 200 (in place of intake gas cooler 118). In this embodiment, the circuit fluid passage 156 includes first and second heat exchange sections 376, 378, the EGR passage 153 includes an EGR heat exchange section 180, and the fresh intake gas passage 151 includes an intake heat exchange section 182. The first and second heat exchange sections 376, 378 are in series with one another, which may provide more control over how the EGR passage 153 and fresh intake gas passage 151 are cooled. The first heat exchange section 376 is positioned fluidly upstream of the second heat exchange section 378.

The first heat exchange section 376 overlaps the EGR heat exchange section 180, and the second heat exchange section 378 overlaps the intake heat exchange section 182. In some embodiments, the first heat exchange section 376 does not overlap the intake heat exchange section 182, and the second heat exchange section 378 does not overlap the EGR heat exchange section 180. The direction of flow of the first circuit fluid 139 may be opposite to a direction of flow of the fresh intake gas, and the direction of flow of the first circuit fluid 139 may be opposite to a direction of flow of the recirculated exhaust gas. Such directions ensure that the temperature difference between the passages is as large as possible, so as to cool the EGR heat exchange section 182 and fresh intake gas passage 151 quickly and adequately.

Figure 4:
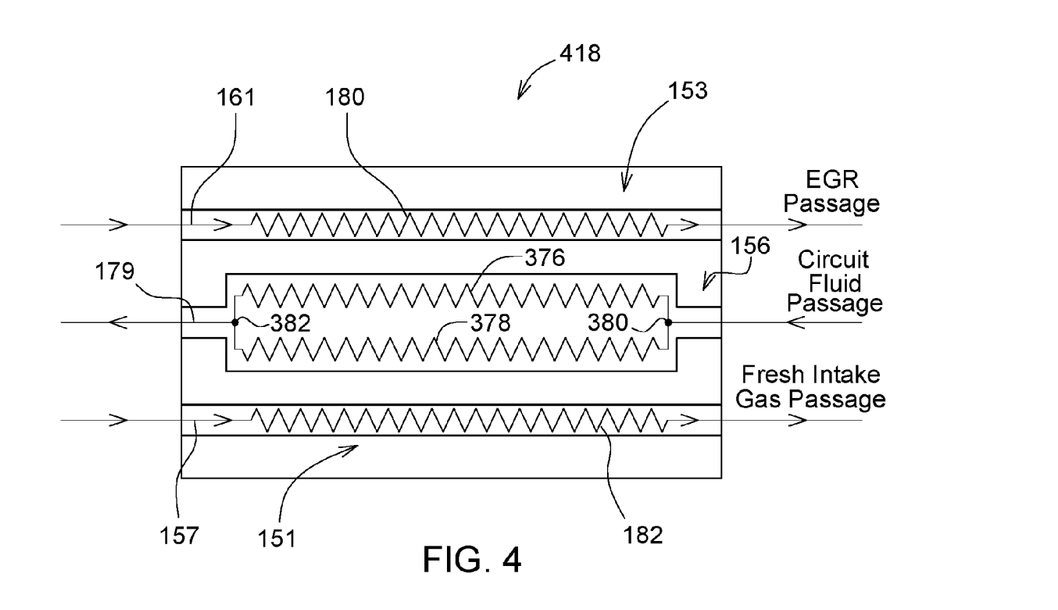
FIG. 4 is a schematic illustration of an intake gas cooler, having first and second heat exchange sections in parallel with one another.

Next, referring to FIG. 4, there is shown a third embodiment of an intake gas cooler 418, which could be used in, for example, the first or second power systems 100, 200 (in place of intake gas cooler 118). In this embodiment, the first and second heat exchange sections 376, 378 are in fluid parallel with one another, in that the fluid flow splits at a first node 380 upstream of the first and second heat exchange sections 376, 378, and then recombines at a second node 382 downstream thereof. The first heat exchange section 376 is positioned between the EGR heat exchange section 180 and the second heat exchange section 378. The second heat exchange section 378 is positioned between the intake heat exchange section 182 and the first heat exchange section 376. Such positioning of the first and second heat exchange sections 376, 378 provide more control over how the EGR passage 153 and fresh intake gas passage 151 are cooled.

Figure 5:
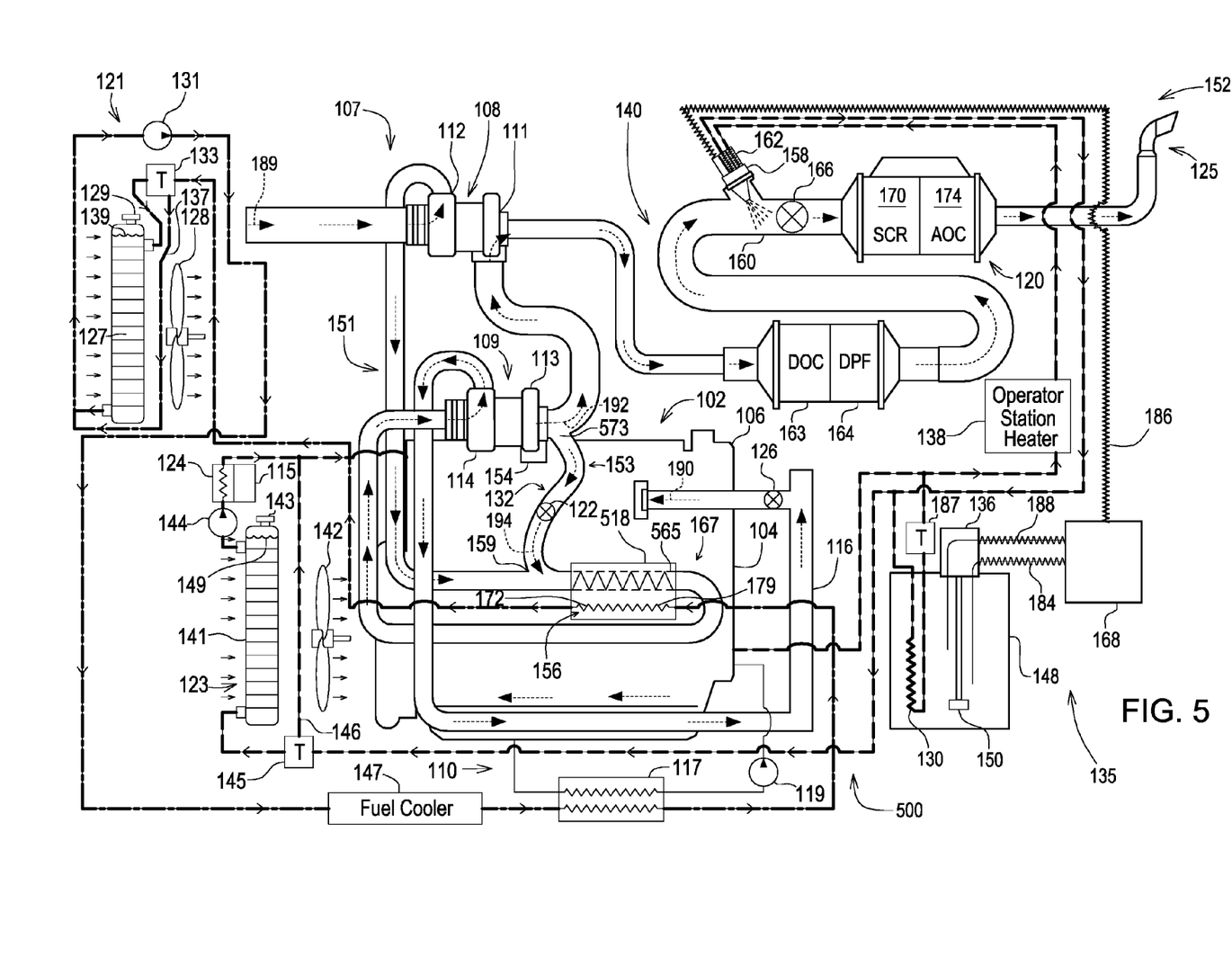
FIG. 5 is a schematic of a third embodiment of a power system, having an intake gas cooler that defines a portion of a combined intake gas passage.

FIG. 5 illustrates a third embodiment of the power system 300. In this embodiment, there is a fresh intake gas passage 151, a combined intake gas passage 167 positioned gaseously downstream of the fresh intake gas passage 151, and a combined intake gas passage 167 positioned gaseously downstream of the fresh intake gas passage 151 and the EGR passage 153. The combined intake gas passage 167 is configured to receive a combined intake gas, which is a combination of the fresh intake gas and the recirculated exhaust gas. A portion 565 of the combined intake gas passage 167 is defined by the intake gas cooler 518.

In the power system 300, the EGR valve 122 may be positioned gaseously upstream of the intake gas cooler 118. The fresh intake gas passage 151 and the combined intake gas passage 167 and the EGR passage 153 meet at a mixing junction 159, which is positioned gaseously upstream of the intake gas cooler 118. Placing the mixing junction 159 at this location forces the combined intake gas through the LP compressor 114, which aids in the mixing of the combined intake gas prior to combustion in the engine 102. Improved mixing may result in improved combustion characteristics of the engine 102. In the embodiment shown, an inlet 573 of the EGR passage 153 may be positioned gaseously between the LP turbine 111 and the HP turbine 113. Further, the EGR valve 122 may be positioned gaseously upstream of the intake gas cooler 118 and the HP compressor 114. While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A power system, comprising:
   an intake gas cooler configured to receive a fresh intake gas for combusting in an engine and a recirculated exhaust gas expelled by the engine for re-combusting therein;
   a fresh intake gas passage configured to receive the fresh intake gas, a portion of the fresh intake gas passage being defined by the intake gas cooler;
   an exhaust gas recirculation (EGR) passage configured to route the recirculated exhaust gas, a portion of the EGR passage being defined by the intake gas cooler;
   an aftercooler positioned gaseously downstream of the fresh intake gas passage, and the aftercooler is positioned to receive only fresh intake gas;
   a circuit fluid passage configured to receive a circuit fluid, a portion of the circuit fluid passage being defined by the intake gas cooler, the portion of the circuit fluid passage being positioned so as to cool the fresh intake gas and the recirculated exhaust gas;
   a first heat transfer circuit comprising a first heat exchanger and a lube oil cooler fluidly coupled thereto, a portion of the first heat transfer circuit being defined by the circuit fluid passage, the lube oil cooler being configured to cool lube oil that circulates through the engine; and
   a second heat transfer circuit fluidly coupled to the engine and comprising a second heat exchanger, the second heat exchanger being configured to cool a second circuit fluid that cools a block and head of the engine, the first heat transfer circuit is separate and distinct from the second heat transfer circuit, such that the circuit fluid does not mix with the second circuit fluid.

2. The power system of claim 1, wherein the aftercooler is an air-to-air cooler, and the aftercooler is not positioned downstream of the EGR passage.

3. The power system of claim 1, wherein the portion of the circuit fluid passage being positioned so as to cool the portion of the fresh intake gas passage that is defined by the intake gas cooler and to cool the portion of the EGR passage that is defined by the intake gas cooler, the portion of the fresh intake gas passage that is defined by the intake gas cooler being separate and distinct from the portion of the EGR passage that is defined by the intake gas cooler, such that the fresh intake gas and the recirculated exhaust gas do not mix in the intake gas cooler.

4. The power system of claim 1, wherein the portion of the fresh intake gas passage is separate and distinct from the portion of the EGR passage, such that the fresh intake gas and the recirculated exhaust gas do not mix in the intake gas cooler.

5. The power system of claim 1, wherein the EGR passage comprises an EGR valve positioned gaseously downstream of the intake gas cooler and upstream of the engine, such that all of the recirculated exhaust gas that passes, through the portion of the EGR passage that is defined by the intake gas cooler, also passes through the EGR valve.

6. The power system of claim 1, wherein:
   the circuit fluid passage comprises a first heat exchange section and a second heat exchange section, the EGR passage comprises an EGR heat exchange section, the fresh intake gas passage comprises an intake heat exchange section;
   the first and second heat exchange sections are in fluid parallel with one another;
   the first heat exchange section is positioned between the EGR heat exchange section and the second heat exchange section; and
   the second heat exchange section is positioned between the intake heat exchange section and the first heat exchange section.

7. The power system of claim 1, further comprising:
   a low pressure (LP) turbocharger gaseously coupled to the engine, the LP turbocharger comprising an LP turbine and an LP compressor coupled thereto; and
   a high pressure (HP) turbocharger gaseously coupled to the engine, the HP turbocharger comprising an HP turbine and an HP compressor coupled thereto, the HP turbine being positioned gaseously upstream of the LP turbine, the HP compressor being positioned gaseously downstream of the LP compressor, and an inlet of the EGR passage being positioned gaseously upstream of the LP turbine and the HP turbine.

8. The power system of claim 7, wherein the portion of the fresh intake gas passage that is defined by the intake gas cooler is positioned gaseously downstream of the HP compressor.

9. The power system of claim 7, further comprising a combined intake gas passage positioned gaseously downstream of the fresh intake gas passage and the EGR passage, the combined intake gas passage configured to receive a combined intake gas comprising the fresh intake gas and the recirculated exhaust gas, wherein:
   the fresh intake gas passage and the combined intake gas passage and the EGR passage meet at a mixing junction; and
   the aftercooler is positioned gaseously downstream of the HP compressor and gaseously upstream of the mixing junction.

* * * * *